US011621746B2

(12) United States Patent
Shake et al.

(10) Patent No.: US 11,621,746 B2
(45) Date of Patent: *Apr. 4, 2023

(54) APPARATUS AND METHOD FOR DETECTION OF CYBER TAMPERING, PHYSICAL TAMPERING, AND CHANGES IN PERFORMANCE OF ELECTRONIC DEVICES

(71) Applicant: Raytheon BBN Technologies Corp., Cambridge, MA (US)

(72) Inventors: Tyler Shake, Sykesville, MD (US); John Dishon, San Diego, CA (US); John-Francis Mergen, Baltimore, MD (US); Zachary Leuschner, Fairfax, VA (US); Thomas Wilkerson, Baltimore, MD (US); David Brian Miller, Washington, DC (US); Ronald Buikema, Chevy Chase, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,704

(22) Filed: Oct. 29, 2021

(65) Prior Publication Data

US 2022/0216899 A1 Jul. 7, 2022

Related U.S. Application Data

(63) Continuation of application No. 16/406,590, filed on May 8, 2019, now Pat. No. 11,201,641.

(51) Int. Cl.
*H04B 7/0426* (2017.01)
*H04B 7/06* (2006.01)
*H04B 7/08* (2006.01)

(52) U.S. Cl.
CPC ......... *H04B 7/0426* (2013.01); *H04B 7/0689* (2013.01); *H04B 7/0868* (2013.01)

(58) Field of Classification Search
CPC .. H04B 7/0426; H04B 7/0689; H04B 7/0868; H04B 11/00; H04B 7/1858;
(Continued)

(56) References Cited

U.S. PATENT DOCUMENTS 4,476,459 A   10/1984   Cooper et al.
6,359,582 B1   3/2002   Macaleese et al.
(Continued)

FOREIGN PATENT DOCUMENTS

WO   WO-2020227375 A1   11/2020

OTHER PUBLICATIONS

"International Application Serial No. PCT/US2020/031625, International Preliminary Report on Patentability dated Nov. 18, 2021", 11 pgs.

(Continued)

*Primary Examiner* — Lana N Le
(74) *Attorney, Agent, or Firm* — Schwegman Lundberg & Woessner, P.A.

(57) ABSTRACT

An analog tamper-detection apparatus (ATAMP) for onboard analysis of a target device includes a plurality of antennas, each antenna of the plurality of antennas disposed within the target device and being electrically isolated from components of the target device. The ATAMP device further includes radio frequency (RF) front-end (RFFE) transmitter circuitry coupled to the plurality of antennas, the RFFE transmitter circuitry configured to illuminate the target device with a plurality of electromagnetic signals emitted via the plurality of antennas, to generate a plurality of mixed RF signals. The ATAMP device further includes RFFE receiver circuitry configured to receive emissions from the (Continued)

target device based on the mixed RF signals, and processing circuitry configured to perform subsequent analysis and evaluation of the target device based on the received emissions. The processing circuitry further generates a notification of the subsequent analysis and evaluation.

20 Claims, 9 Drawing Sheets

(58) Field of Classification Search
CPC ..... H04B 7/18591; Y04S 40/20; G06F 21/50; G06F 21/87; G06F 21/55; G06F 21/552; G06F 21/554; G06F 7/24; G01R 33/62; G01S 13/887; G01S 13/04; G01S 7/411; G01S 13/753; G01S 7/4802; G01S 7/36; G01S 13/78; G01S 11/12; G01S 13/758; G01S 17/06; G01S 7/412; G01S 7/52042; G01S 13/581; G08B 13/2471; G08B 13/2477; G06K 19/0672; G06K 19/07; G06K 19/0723; G06K 7/086; G06K 7/10158; H04K 1/00; H04K 1/06; H04K 3/45; H04K 3/62; H04K 3/68
See application file for complete search history.

(56) References Cited

U.S. PATENT DOCUMENTS

| | | | | |
|---|---|---|---|---|
| 6,768,444 | B2 | 7/2004 | Langsford | |
| 6,967,612 | B1* | 11/2005 | Gorman | G01S 13/04 342/52 |
| 7,804,441 | B1 | 9/2010 | Dechiaro, Jr. | |
| 11,201,641 | B2* | 12/2021 | Shake | H04B 7/0426 |
| 2007/0290916 | A1 | 12/2007 | Ofek | |
| 2010/0219953 | A1* | 9/2010 | Bloy | G01S 13/758 705/28 |
| 2011/0267190 | A1* | 11/2011 | Payson | G06F 21/86 340/539.31 |
| 2013/0121529 | A1* | 5/2013 | Fleisher | G01S 13/887 382/103 |
| 2015/0137830 | A1 | 5/2015 | Keller, III et al. | |
| 2016/0098561 | A1 | 4/2016 | Keller et al. | |
| 2016/0112083 | A1 | 4/2016 | Keller, III et al. | |
| 2016/0124041 | A1 | 5/2016 | Pathak et al. | |
| 2017/0288788 | A1 | 10/2017 | Dishon et al. | |
| 2017/0289786 | A1 | 10/2017 | Dishon et al. | |
| 2019/0140766 | A1 | 5/2019 | Anlage et al. | |
| 2019/0199145 | A1* | 6/2019 | Zeine | H04B 17/318 |
| 2019/0377870 | A1* | 12/2019 | Daniel | G06F 21/554 |
| 2020/0167531 | A1 | 5/2020 | Hallock et al. | |
| 2020/0182995 | A1 | 6/2020 | Zeng et al. | |
| 2020/0389624 | A1 | 12/2020 | Oberholzer | |
| 2021/0033703 | A1 | 2/2021 | Hammerschmidt | |
| 2021/0091829 | A1 | 3/2021 | Shake et al. | |
| 2021/0165092 | A1* | 6/2021 | Hester | G06K 7/10168 |

OTHER PUBLICATIONS

U.S. Appl. No. 16/406,590, filed May 8, 2019, Apparatus and Method for Detection of Cyber Tampering Physical Tampering, and Changes in Performance of Electronic Devices.
"U.S. Appl. No. 16/406,590, Non Final Office Action dated Mar. 18, 2021".
"U.S. Appl. No. 16/406,590, Notice of Allowance dated Aug. 9, 2021", 8 pgs.
"U.S. Appl. No. 16/406,590, Response filed May 26, 2021 to Non Final Office Action dated Mar. 18, 2021", 14 pgs.
"International Application Serial No. PCT/US2020/031625, International Search Report dated Aug. 10 2020", 5 pgs.
"International Application Serial No. PCT/US2020/031625, Written Opinion dated Aug. 10, 2020", 9 pgs.
Nazari , Alireza, et al., "EDDIE: EM-Based Detection of Deviations in Program Execution", ISCA, (2017), 333-346.
Osechas, O, et al., "Addressing Vulnerabilities of the CNS Infrastructure to Targeted Radio Interference", IEEE Aerospace and Electronic Systems Magazine, vol. 32, No. 11, (Nov. 2017), 34-42.
Riley, Ronald, et al., "Extraction and validation of algorithms based on analog side-channels", Proceeding of SPIE, vol. 10185, [Online]. Retrieved from the Internet: <URL: https://www.spiedigitallibrary.org/conference-proceedings-of-spie>, (2017), 16 pgs.
Sehatbakhsh, Nader, et al., "Leveraging Electromagnetic Emanations for IoT Security (Demo)", IEEE International Symposium on Hardware-Oriented Security and Trust (HOST), (2017), 1 pg.

* cited by examiner

APPARATUS AND METHOD FOR DETECTION OF CYBER TAMPERING, PHYSICAL TAMPERING, AND CHANGES IN PERFORMANCE OF ELECTRONIC DEVICES

This application claims the benefit of priority to U.S. patent application Ser. No. 16/406,590, filed May 8, 2019, which is incorporated herein by reference in its entirety.

TECHNICAL FIELD

Aspects disclosed herein pertain to using emissions from a system to determine its operation, behavior, or state. Some aspects pertain to the apparatus and methods for detection of cyber tampering, physical tampering, and changes in the performance of electronic devices.

BACKGROUND

Over at least the past thirty-five years there has been a continuing interest in the ability to detect tampering with computing systems. A number of methods have been explored, including receiving inadvertent radio emissions, visible light examination, magnetic sensing, temperature sensing, multispectral analysis, acoustic sensing, and mechanical sensing. All of the previous methods have been limited in a combination of precision, range, and general applicability.

Computing device security is typically maintained using software to detect cyber intrusions. Many devices do not have the resources (memory, computational capability, etc.) to utilize such software and cannot detect malicious codes or prevent its activation. Larger computational systems do not have diagnostics to determine if changes to their electronic designs and functions have been altered during production or after purchase. Such systems are unequipped to detect operational changes from standard operation conditions when the device is used. While many devices have simple anti-intrusion detection systems, anti-tamper systems do not provide instantaneous and real-time alerts. Most small and many large computational and electronic devices do not have sensors to identify changes to performance that indicate future device failure or sub-standard performance. Known methods for observing target device characteristics and behavior during operation require some combination of software and/or hardware resident on the target device, knowledge of target device communication protocols and modalities, and/or close physical access to the target device. Current and past techniques for detecting device tampering thus require substantial a priori knowledge, are potentially invasive to target device operation, and are susceptible to erroneous or even malicious activities on the target device.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims. The present inventors have recognized, among other things, that particular improvements of the apparatus and methods used for analyzing remotely located target devices, such as computing systems, are possible and would enable specific distinct advantages.

A radio frequency (RF) sensor system (also referred to as ATAMP system or ATAMP device) is disclosed and can be configured to use the analog domain for detection of tampering with software, hardware, and device operation of a target device. The RF sensor system also provides indications of changes in device functionality and device performance, allowing for indication of future device failure or sub-standard performance. In some aspects, components of the ATAMP system (e.g., one or more antennas, a radio frequency front end (RFFE) that includes transmitting and receiving circuitry, as well as processing circuitry) can be built into electronics of the target device or can be configured as a stand-alone device for detecting tampering with a target device.

In some aspects, the ATAMP system is air-gapped from the electronic device it protects (also referred to herein as "the target device" or "the protected device"). The ATAMP system can include components that are built on, near, or into one or more multi-layer circuit boards of the protected device. In this regard, the disclosed techniques can be used for providing security against cyber threats, electronic modification, and tampering on devices which have no such protection and lack the onboard resources to provide them. Because the ATAMP system is air-gapped from the circuitry of the board, it is not susceptible to cyber-attack. As used herein, the term "air-gapped" indicates that one device is isolated from another via non-conductive means (i.e., means that are electrically non-conductive), including air or another non-conductive (e.g., dielectric) material.

In an example, an ATAMP apparatus for onboard analysis of a target device includes a plurality of antennas, with each antenna of the plurality of antennas being disposed within the target device and being electrically isolated (e.g., air-gapped) from components of the target device. The ATAMP device further includes a radio frequency (RF) front-end (RFFE) transmitter circuitry coupled to the plurality of antennas. The RFFE transmitter circuitry is configured to illuminate the target device with a plurality of electromagnetic signals emitted via the plurality of antennas, to generate a plurality of mixed RF signals. The ATAMP device further includes an RFFE receiver circuitry configured to receive emissions from the target device based on the mixed RF signals, and processing circuitry. The processing circuitry is configured to perform subsequent analysis and evaluation of the target device based on the received emissions, and generate a notification of the subsequent analysis and evaluation.

In an example, a method for onboard analysis of a target device includes illuminating the target device with a plurality of electromagnetic signals emitted via a plurality of antennas (e.g., at least two antennas) that are air-gapped with the target device to generate a plurality of mixed radio frequency (RF) signals. Generating the plurality of mixed RF signals results in a resonant RF signal radiating from the target device. The method further includes receiving the resonant RF signal using receiver circuitry for subsequent analysis and evaluation of the target device. A notification is generated based on the analysis and evaluation of the target device.

In an example, a non-transitory computer-readable storage medium that stores instructions for execution by one or more processors of an ATAMP device, the instructions to configure the one or more processors to cause the ATAMP device to illuminate a target device with a plurality of electromagnetic signals emitted via a corresponding plurality of antennas that are air-gapped with the target device to generate a plurality of mixed radio frequency (RF) signals. Generating the plurality of mixed RF signals resulting in a resonant RF signal radiating from the target device. The resonant RF signal is received using receiver circuitry for subsequent analysis and evaluation of the target device. A reference evaluation of the target device is compared with the received resonant RF signal to detect physical alteration or tampering of the target device. A notification is generated based on the detected physical alteration or tampering of the target device.

Figure 1:
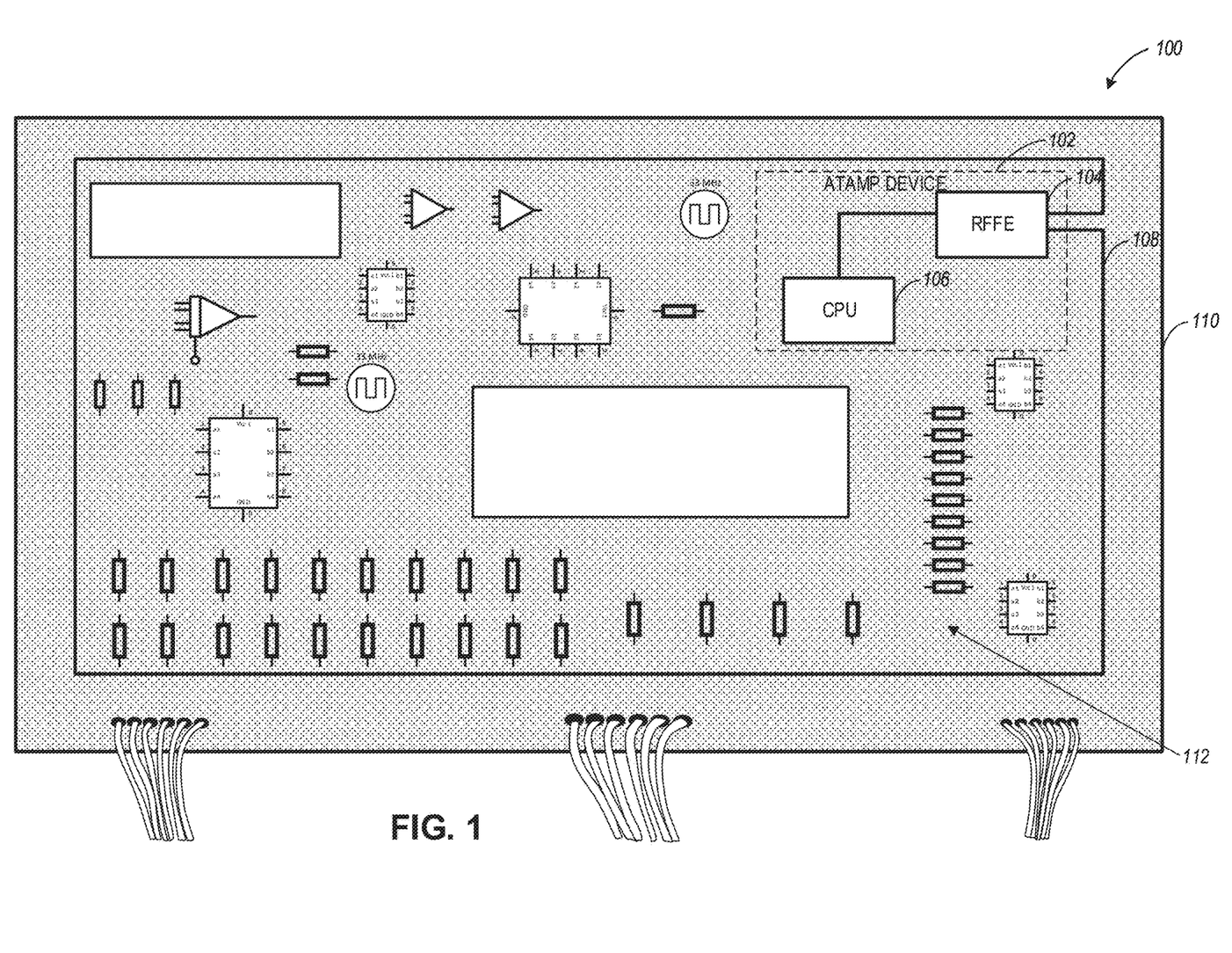
FIG. 1 shows an example of an analog tamper-detection (ATAMP) system within a target device in accordance with some embodiments.

FIG. 1 shows an example of an ATAMP system (or device) 102 within a target device 100 in accordance with some embodiments. Referring to FIG. 1, the ATAMP device 102 comprises suitable circuitry, logic, interfaces, and/or code and is configured to perform tamper detection functionalities disclosed herein. The ATAMP device 102 elements include at least one tunable RF antenna 108, an RFFE 104, and a processor (e.g., CPU) 106. The at least one tunable RF antenna 108 is not connected to the electronics/components (e.g., 112) of the target device 100. For example, the at least one tunable RF antenna 108 can be air-gapped so that it is electrically isolated from components of the target device 100. The RFFE 104 and the CPU 106 are also air-gapped from components 112 of the target device 100. The CPU 106 is configured to control the antenna frequency of the at least one antenna 108, configure ATAMP low-power RF transmissions (e.g., using the transmit circuitry within the RFFE 104), analyze device emissions, and provide a warning or electronic protection to/of the protected device 100.

In some aspects, the ATAMP device 102 can utilize a common power source as the target device 100 or a power source of the ATAMP device 102 can be based on a magnetic or another type of wireless charging connection with a power source of the target device 100.

In some aspects, the at least one antenna 108 can be a loop antenna or another type of antenna. Even though FIG. 1 illustrates a single loop antenna as the at least one antenna 108, the disclosure is not limited in this regard and more than one antennas can be used, as illustrated for example in connection with FIG. 2.

Figure 2:
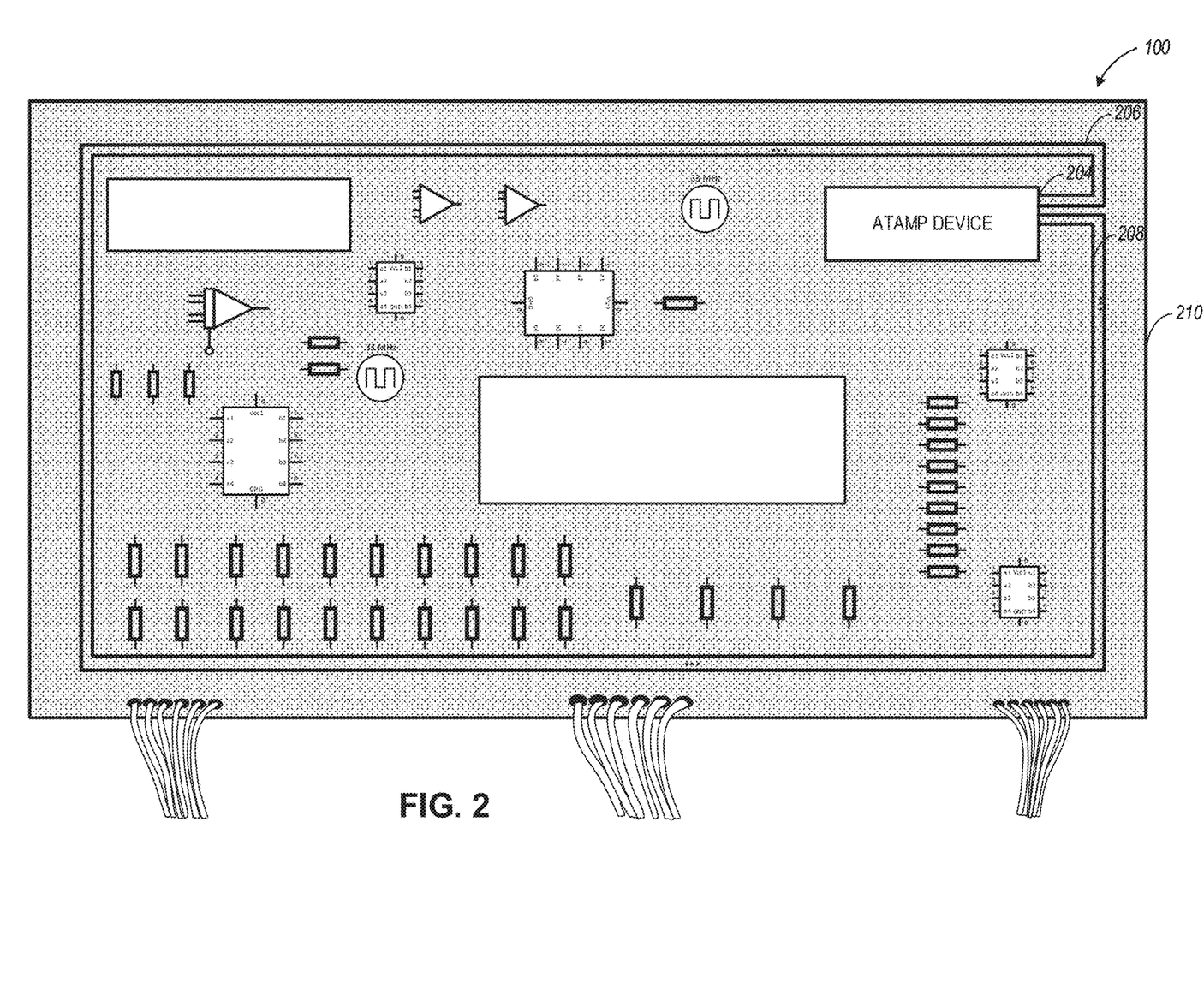
FIG. 2 shows another example of an ATAMP system within a target device in accordance with some embodiments.

FIG. 2 shows another example of a tamper-detection system within a target device in accordance with some embodiments. Referring to FIG. 2, the ATAMP device 204 can be similar to the ATAMP device 102 of FIG. 1, except that FIG. 2 illustrates the ATAMP device 204 using a plurality of antennas 206, . . . , 208. The antennas 206, . . . , 208 can include loop antennas or another type of antennas that are electrically isolated (e.g., air-gapped) with components of the target device 100. The ATAMP device 204 includes an RFFE and a CPU (not illustrated in FIG. 2), similar to the RFFE and the CPU of ATAMP device 102. The RFFE of the ATAMP device 204 can include a separate transmit circuitry for each of the antennas 206, . . . , 208, with each antenna being separately configurable for transmitting RF signals in a predetermined frequency.

All devices emit RF energy at different frequencies. The ATAMP device provides onboard monitoring of these emissions and identifies changes to these emissions that can signal cyber tampering (e.g., software tampering), electronic tampering, physical tampering, or changes to device operational condition. Highlights of the tamper-detection functionalities that can be performed by the ATAMP device 102/204 are as follows:

(a) Inter-modulation detection technique: by providing RF transmissions from the ATAMP antenna(s) (e.g., one or more of antennas 206, . . . , 208), resonant RF signal(s) or mixing signal products are created in the device that will change if the target device is physically altered. By monitoring the resonant signal(s) or mixing signal products (e.g., by the CPU within the ATAMP device), physical changes to the target device can be detected. An example implementation can use a reference evaluation (or a "gold image") at a time when the ATAMP device is installed with the target device (e.g., within the target device) and the ATAMP device is trained at the factory. In this regard, the "gold image" can be generated (which can include characteristics of the initial resonant signal generated at manufacturing/installation time at the factory) and stored as a read-only image of a known good state to detect deviations in subsequent device uses;

(b) Forced non-linear emissions (FNLE) detection techniques: FNLE are generated by the ATAMP emission interactions with signals in the protected device. The FNLE can be monitored by the ATAMP device to determine if changes to the electronic design of the device are made. Changes in the RF FNLE emissions alert the ATAMP device to changes in the protected device electronics:

(c) Passive detection techniques: unintended RF emissions (UE) of the protected device are monitored by the ATAMP device. Analysis of the UE (and the FNLE) allows the ATAMP device to detect unwanted software or malware that are running on the protected device;

(d) The air-gapped design of the ATAMP device prohibits external cyber-attacks on the ATAMP protection system and circuits, making it a reliable cyber protection system that cannot be affected by external cyber threats;

(e) Changes in the pattern of the UE and the FNLE can be used to detect changes in device performance and signal conditions that might lead to or indicate future device failure or sub-standard performance; and (f) ATAMP device reporting can be accomplished (e.g., via the CPU 106) by a variety of means, such as on-board visual or audio notifications, data transmission via RF or trigger fault circuitry, as well as other wired or wireless means of communicating a notification or alert as a result of the tamper-detection techniques disclosed herein.

In this regard, the ATAMP device (e.g., 102 or 204) can perform the following tamper-detection functions: detection of component and sub-component level tampering of electronic circuitry in near-real-time; air-gapped security implementation separated from the protected device; detection of malware/cyber-attacks in low-resource computational devices; and detection of device sub-standard performance and prediction of device failure. Example tamper detection techniques that can be performed by the ATAMP device are further described in connection with FIG. 3-FIG. 6.

Figure 3:
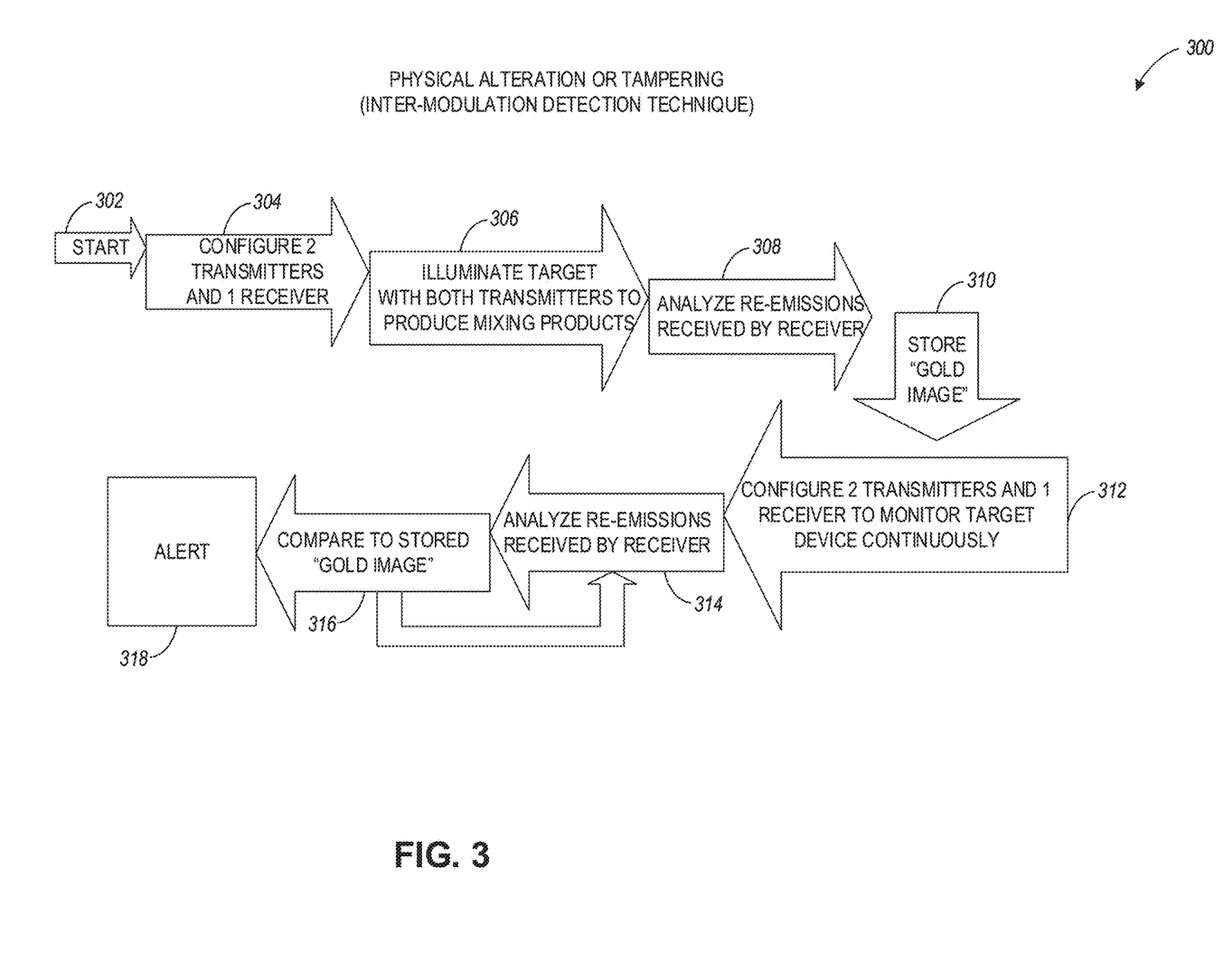
FIG. 3 illustrates a flow chart of an inter-modulation detection technique, which can be used in connection with a tamper-detection system in accordance with some embodiments.

FIG. 3 illustrates a flow chart of an inter-modulation detection technique 300, which can be used in connection with a tamper-detection system in accordance with some embodiments. The inter-modulation detection technique 300 can be used for detecting physical alteration or tampering of the target device.

Where physical security of electronic devices is required, there can be multiple passive and active anti-tamper devices that can be used to notify users that the device has been physically disturbed. Small inexpensive devices typically utilize adhesive films with holograms imprinted on them. Tampering is detected when a user notices a broken seal on the device. More expensive devices, or for devices where real-time tampering notification is required, often utilize RF standing wave techniques to detect intrusion. For example, prior techniques can leverage carefully designed and configured transmitters to create the standing waves used for detection. The amplitude of the standing wave changes when the device is tampered with and a notification is provided or recorded by the intrusion detection system. In some aspects, the ATAMP device is configured to monitor both self-generated and forced emissions within electronic devices and to note changes in the standing wave characteristics of those. This technique can be used for providing real-time anti-tampering notification for different types of electronic systems which employ it. In this regard, techniques disclosed herein utilize unintended emissions from the device (opposed to the configured emissions) or analysis signal(s) to detect tampering.

The intermodulation detection technique refers to the use of two or more illumination signals to produce passive or active nonlinear mixing products for analysis. These mixing products can be leveraged to detect hardware changes or alterations on the target device. The passive nonlinear mixing products provide an additional advantage in that the monitored device does not need to be powered on so that the nonlinear mixing products (e.g., signals) can be generated.

Referring to FIG. 3, the inter-modulation detection technique 300 can start at operation 302, and at operation 304 (e.g., at time of manufacturing the ATAMP device and the target device), two transmitters and one receiver can be configured within the ATAMP device 204. For example, two transmitters within the RFFE of the ATAMP device can be configured for transmitting RF signals using two antennas of the plurality of antennas 206, . . . , 208. At operation 306, the target device is illuminated with signals generated by both transmitters to generate mixing products (or signals). At operation 308, re-emissions by the target device are received by a receiver circuit within the RFFE and analyzed by the CPU to generate the "gold image" (e.g., signal characteristics associated with the re-emissions by the target device). At operation 310, the generated "gold image" can be stored by the ATAMP device for subsequent monitoring and tamper detection. At operation 312, the two transmitters and one receiver can be configured to monitor the target device continuously by, e.g., periodically illuminating the target device and receiving re-emissions from the target device based on the illumination. In some aspects, the target device can be powered off while the monitoring under this technique takes place. At operation 314, the re-emissions are received by the receiver circuit within the ATAMP device and analyzed by the CPU. More specifically, at operation 316, the CPU can compare the detected re-emissions (e.g., a resonant signal generated by components of the target device when illuminated with the mixing products from the RF signals emitted by the antennas) with the "gold image". Based on the comparison, at operation 318, an alert can be generated, or processing can resume at operation 314 for continuous analysis of signal re-emissions.

To conduct the device illumination, the first transmitter within the ATAMP device is configured to transmit signals at a starting frequency, and the second transmitter is configured to transmit signals at an offset of the first transmitter's frequency. For example, if the first transmitter is configured for 100 MHz, the second transmitter is configured for a set offset of 5 MHz from the first transmitter frequency, or 105 MHz in this example. The receiver within the ATAMP device can be configured to monitor for mixing products at an offset from the two transmitters. For example, the receiver can be configured to observe at the frequency band of 110 MHz to 130 MHz in this example. To analyze the device, the transmitters are frequency swept in coordination while the receiver is also frequency swept in coordination to observe mixing products. An example next frequency step would be the first transmitter to transmit signals at 105 MHz, the second transmitter to transmit signals at 110 MHz, and the receiver to monitor the frequency band of 115 MHz to 135 MHz. The frequency bands mentioned herein are simply for illustration and other preconfigured transmission frequencies and monitoring frequency ranges can be used as well. Depending on the target device, the transmitters and receivers can be configured for different sweep parameters.

In some aspects, the CPU can perform analysis of the mixing products produced from the transmission of the signals by the two transmitters using one or more of the following techniques for performing the analysis: (1) frequency distribution metrics, (2) spectral power distribution metrics, (3) total spectral density, (4) patterns derived from changes in frequency, amplitude, or phase, (5) existence of non-linear mixing spurs or mixing products, (6) demodulated signals, (7) statistical classification techniques of spectral features, and (8) additionally derived patterns utilizing analysis of n-levels of n-features within the spectrum. Other metrics or techniques can be used as well.

Figure 4A:
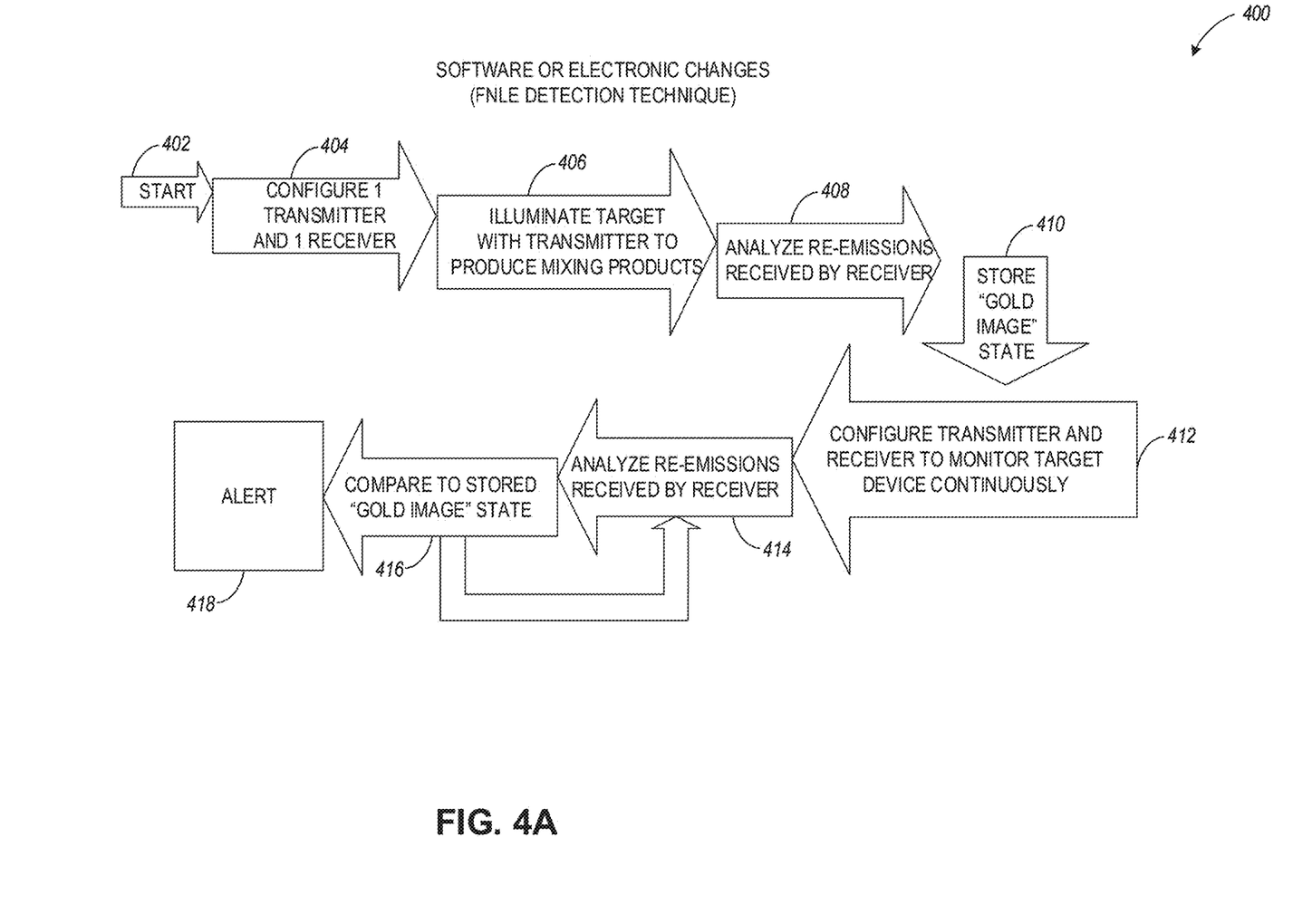
FIG. 4A illustrates a flow chart of a forced non-linear emissions (FNLE) detection technique, which can be used in connection with a tamper-detection system in accordance with some embodiments.

FIG. 4A illustrates a flow chart of a forced non-linear emissions (FNLE) detection technique 400, which can be used in connection with a tamper-detection system in accordance with some embodiments. The FNLE detection technique can be used to detect cyber tampering, malware, and electronic tampering.

Cyber Tampering and Malware. The ATAMP device provides protection against cyber intrusions by monitoring of both forced and unintended emissions of the protected device. During standard operations, the device produces unintended emissions (UE) at very low power levels. Forced non-linear emissions (FNLE) are created by illuminating the circuits with an external RF signal (generated by the ATAMP transmit circuitry). Creation and detection of UE and FNLE are facilitated by the proximity of the ATAMP antenna to the device—it is part of the device structure, and by the housings of the protected device which can provide a reverberation chamber and improve the amplitude of the signals. The ATAMP device monitors the UE and FNLE and catalogs them for near-real-time analysis. Changes from the patterns of emissions under standard operating conditions signal the advent of malware operating on the protected device. The ATAMP device can provide a warning or act to halt operations affected by the malware.

In connection with FNLE, additional non-linear mixing products can be produced for complex devices, particularly CMOS circuits. These include (1) low frequency, unintended emissions, extracted via FNLE, (2) cross-modulation products (CMPs), caused by coupling with the switching (clock) circuitry, (3) additional non-linear mixing spurs cause by interacting with active onboard components (also labeled as CMPs), and (4) more additional-linear mixing signal products caused by parasitic impedance changes by the FNLE signal. The culmination of these signals can be used to remotely analysis a target device from a distance.

To analyze a device via the FNLE, multiple analysis techniques can be utilized. Such techniques involve more processing than simple spectrum sensing and can include (1) frequency distribution metrics, (2) spectral power distribution metrics, (3) total spectral density, (4) patterns derived from changes in frequency, amplitude, or phase, (5) existence of non-linear mixing spurs or mixing products, (6) demodulated signals, (7) statistical classification techniques of spectral features, (8) additionally derived patterns utilizing analysis of n-levels of n-features within the spectrum, or other techniques.

Electronic Tampering. The circuits of electronic devices can act as antennas when illuminated by external RF energy. The gain of these circuit antennas is affected by their length and impedance. Additionally, non-linear devices like transistors and diodes can act as mixers to combine signals carried by the circuit and RF illumination energy to create FNLE. A device with a standard set of electronics under standard operating conditions will produce a set of standard patterns of FNLE. If new electronic circuits are added or switched-in to achieve altered device performance, the pattern of FNLE will change. The amplitude of some FNLE will drop or rise and new FNLE may be detected. The ATAMP device can provide a near-real-time warning of changes to the electronics or their electronic functions through the creation and monitoring of FNLE in the protected device.

Referring to FIG. 4A, the FNLE detection technique 400 can start at operation 402, and at operation 404 (e.g., at time of manufacturing the ATAMP device and the target device), one transmitters and one receiver can be configured within the ATAMP device 204. For example, one transmitter within the RFFE of the ATAMP device can be configured for transmitting RF signals using one antenna of the plurality of antennas 206, . . . , 208. At operation 406, the target device (e.g., when it is powered on) is illuminated with signals generated by the single transmitter to generate mixing products (or signals). At operation 408, re-emissions by the target device are received by a receiver circuit within the RFFE and analyzed by the CPU to generate the "gold image" (e.g., signal characteristics associated with the re-emissions by the target device). At operation 410, the generated "gold image" can be stored by the ATAMP device for subsequent monitoring and tamper detection. At operation 412, the single transmitter and the single receiver can be configured to monitor the target device continuously by, e.g., periodically illuminating the target device and receiving re-emissions from the target device based on the illumination. In some aspects, the target device can remain powered on while the monitoring under this technique takes place. At operation 414, the re-emissions are received by the receiver within the ATAMP device and analyzed by the CPU. More specifically, at operation 416, the CPU can compare the detected re-emissions with the "gold image". Based on the comparison, at operation 418, an alert can be generated, or processing can resume at operation 414 for continuous analysis of signal re-emissions.

In this regard, the FNLE detection technique requires only one transmitter and the device to be powered on. This technique is advantageous in detecting changes in software or electronic changes. The illumination signal is configured to be frequency swept and the receiver is configured to be swept in coordination. The receiver can be configured to observe a band at some offset from the illumination signal. An example is illustrated in FIG. 4B.

Figure 4B:
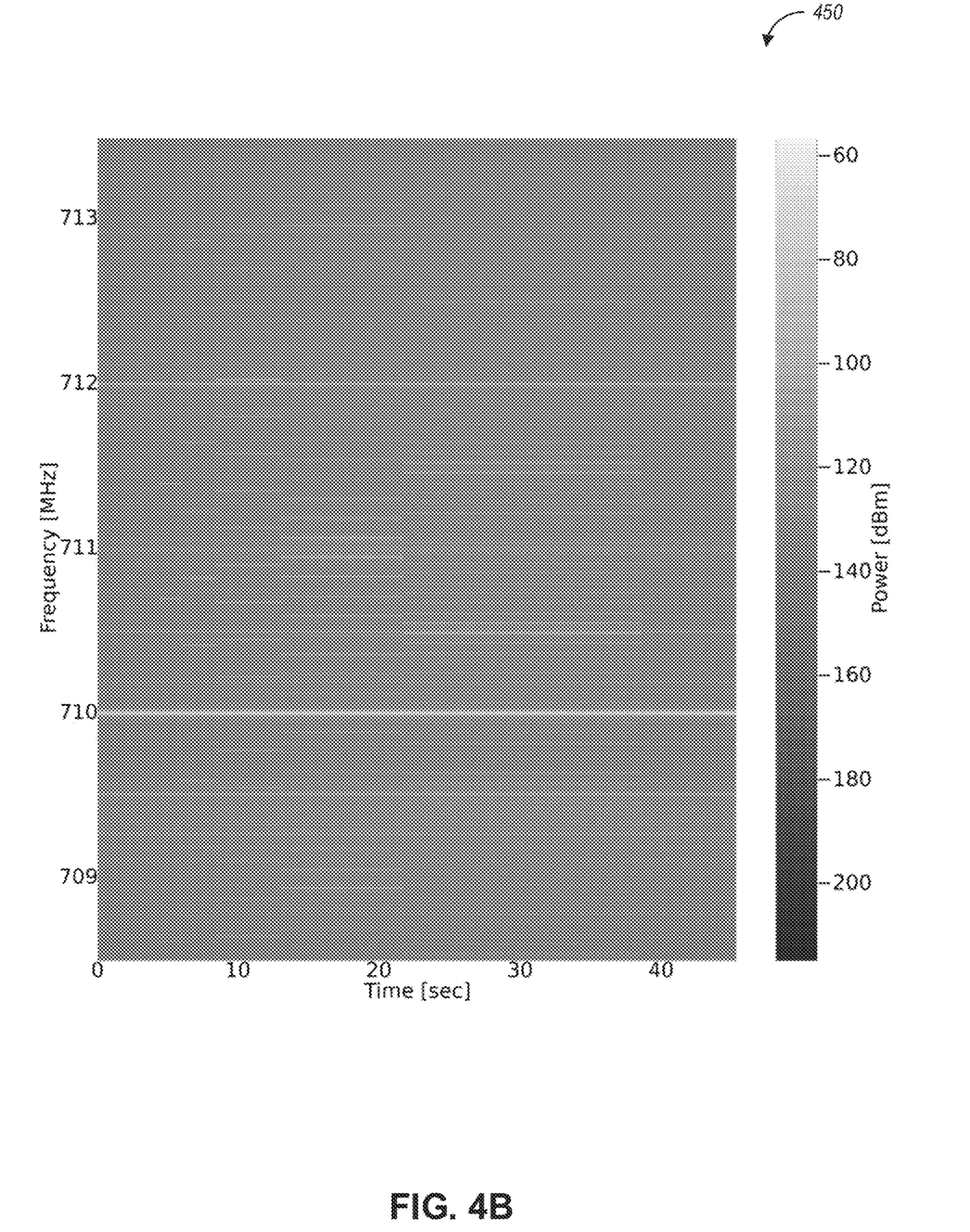
FIG. 4B illustrates an example of FNLE spectrogram for analysis in accordance with some embodiments.

FIG. 4B illustrates an example of FNLE spectrogram 450 for analysis in accordance with some embodiments. Referring to FIG. 4B, spectrogram 450 illustrates that the target device is illuminated at 710 MHz, with a receiver of the ATAMP device configured to observe 708.5 MHz to 713.5 MHz. This produces mixing products seen throughout the re-emission spectrum. The mixing products can be analyzed in a variety of ways, as discussed hereinabove.

Figure 5A:
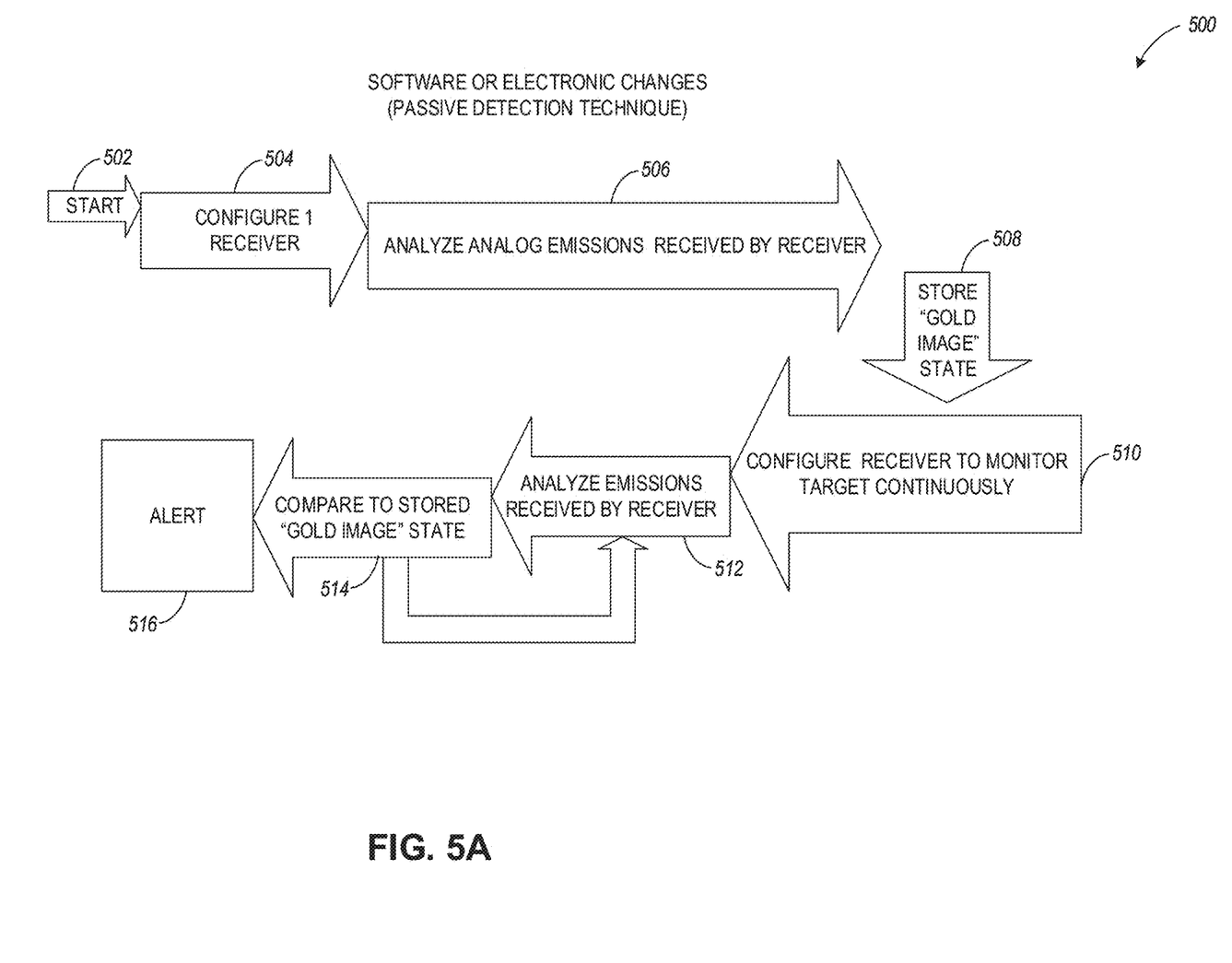
FIG. 5A illustrates a flow chart of a passive detection technique, which can be used in connection with a tamper-detection system in accordance with some embodiments.

FIG. 5A illustrates a flow chart of a passive detection technique 500, which can be used in connection with a tamper-detection system in accordance with some embodiments.

Techniques disclosed herein can be used to monitor device performance and operating conditions. For example, the ATAMP device monitors the FNLE emissions as well as unintended emissions of a protected device over time. These emissions may change as the device ages and particularly could change if portions of the electronics begin to fail. By monitoring the device emissions, the ATAMP device can detect both sub-standard performances and notify the user of potential conditions that might lead to device failure. The ATAMP device can be configured to distinguish between tampering and device degradation as these are two distinct states.

Referring to FIG. 5A, the passive detection technique 500 can start at operation 502, and at operation 504 (e.g., at time of manufacturing the ATAMP device and the target device), one receiver can be configured within the ATAMP device 204 for receiving emissions by the target device. At operation 506, the target device (e.g., when it is powered on) generates emissions (e.g., unintended emissions) and the CPU analyzes the analog emissions received by the receiver to generate the "gold image" of the unintended emissions. At operation 508, the generated "gold image" can be stored by the ATAMP device for subsequent monitoring and tamper detection. At operation 510, the receiver can be configured to monitor the target device continuously by, e.g., periodically monitoring and receiving unintended emissions. At operation 512, the emissions are received by the receiver and analyzed by the CPU. More specifically, at operation 514, the CPU can compare the detected emissions with the "gold image". Based on the comparison, at operation 516, an alert can be generated, or processing can resume at operation 512 for continuous analysis of signal emissions.

Figure 5B:
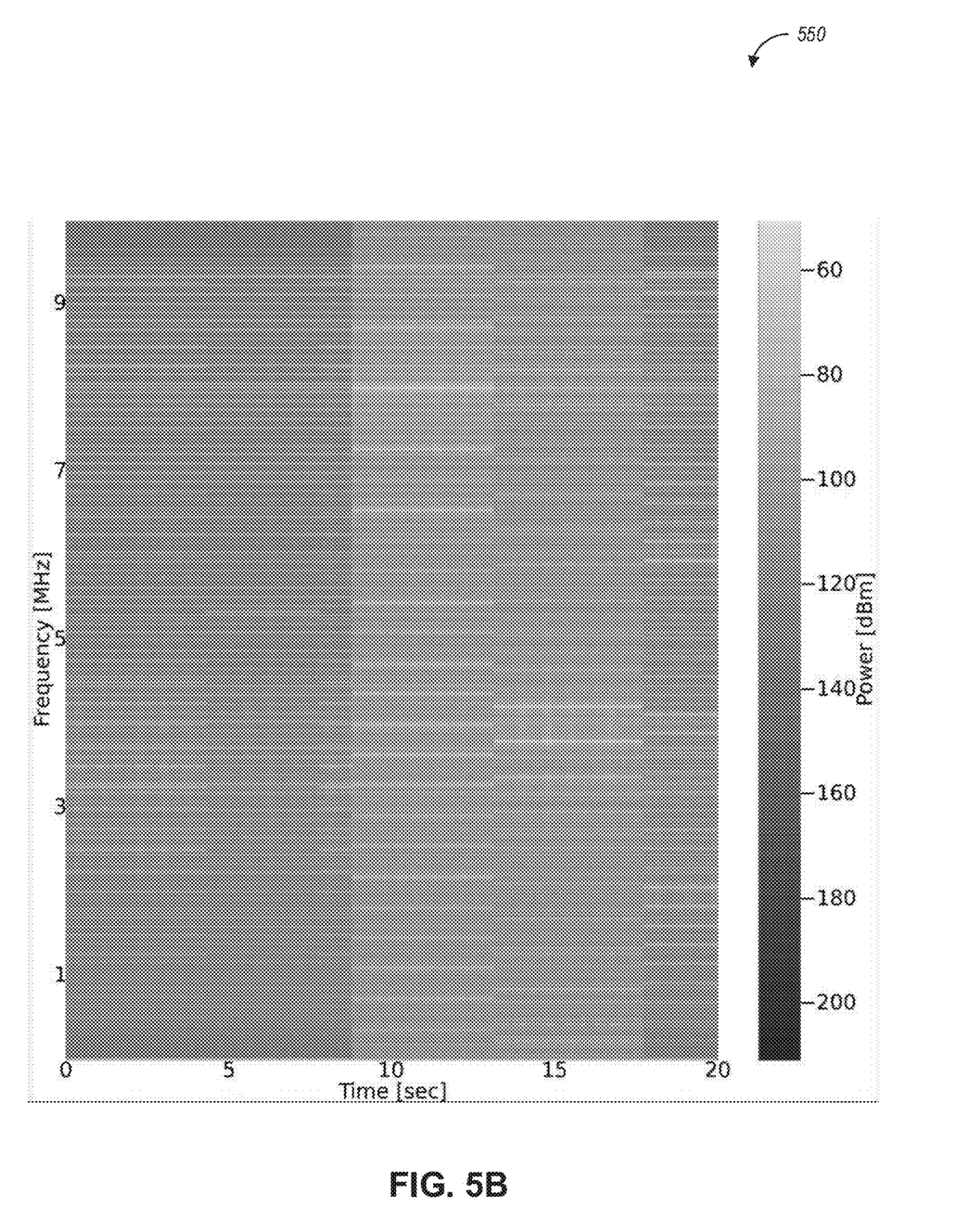
FIG. 5B illustrates an example of passive spectrogram for analysis in accordance with some embodiments.

Similar to the above techniques, the passive detection technique requires the use of only the ATAMP device receiver and a powered-on target device. The receiver is set to observe a frequency band for analog signals (e.g., unintended emissions) generated by the monitored (target) device. An example is illustrated in FIG. 5B. More specifically, FIG. 5B illustrates an example of passive spectrogram 550 for analysis in accordance with some embodiments. In passive spectrogram 550, a receiver in the ATAMP device monitors a target device for emissions in the frequency range of 0-10 MHz. The device inherently produces analog emissions, as seen in the spectrogram 550, which emissions can be analyzed in a variety of ways, as discussed hereinabove.

Figure 6:
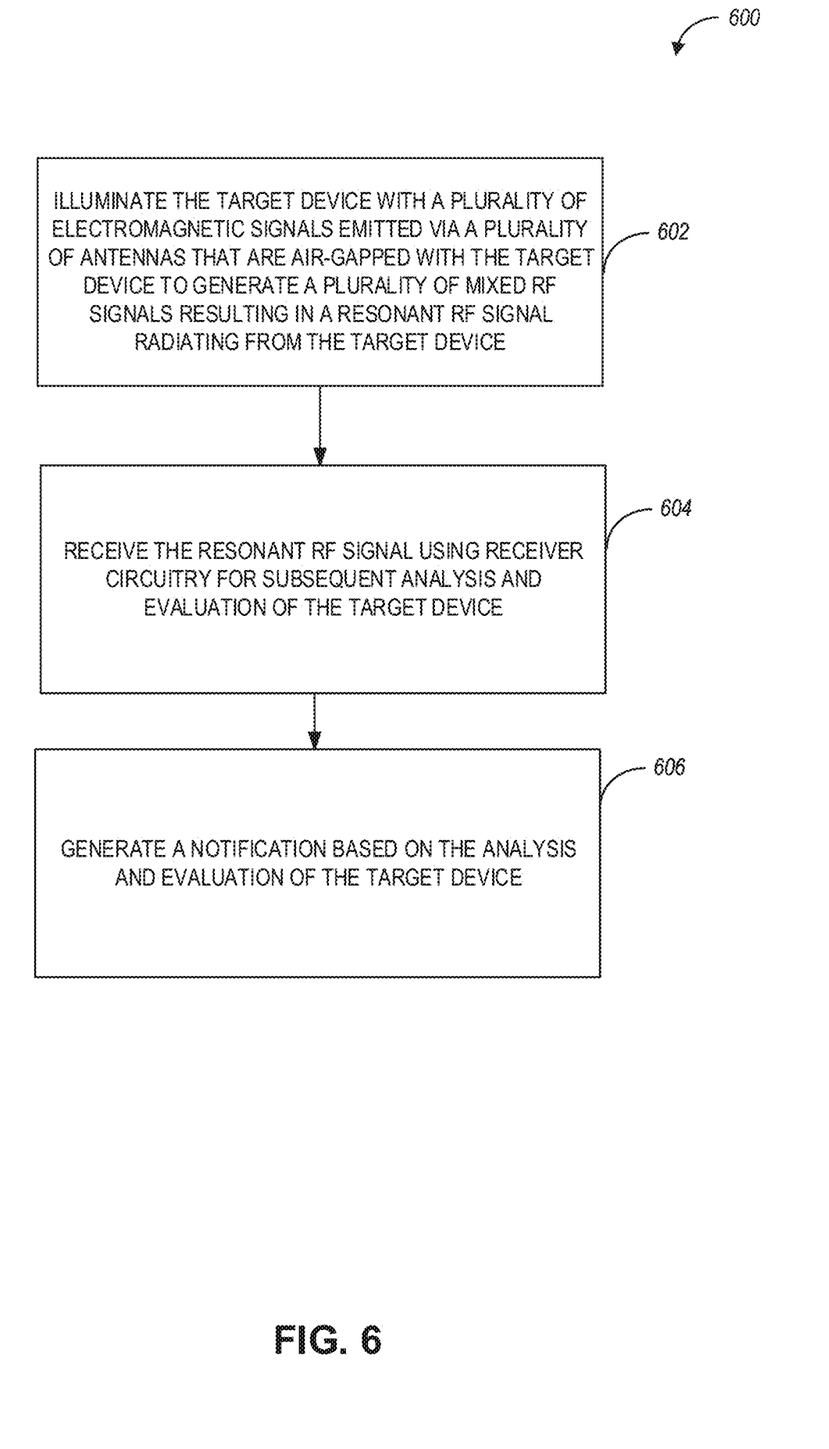
FIG. 6 illustrates a flow chart of an example method for on-board analysis of a target device in accordance with some embodiments.

FIG. 6 illustrates a flow chart of an example method 600 for onboard analysis of a target device in accordance with some embodiments. Referring to FIG. 6, method 600 can be performed by the ATAMP device 102 of FIG. 1 or 204 of FIG. 2. At operation 602, the target device is illuminated with a plurality of electromagnetic signals emitted via a plurality of antennas that are air-gapped with the target device to generate a plurality of mixed radio frequency (RF) signals, generating the plurality of mixed RF signals resulting in a resonant RF signal radiating from the target device. More specifically, two transmitters within the RFFE circuitry of the ATAMP device 204 can use two of the antennas 206, . . . , 208 to transmit RF signals and illuminate target device 100 resulting in a resonant RF signal radiating from the target device. At operation 604, the resonant RF signal is received using receiver circuitry for subsequent analysis and evaluation of the target device. For example, the resonant RF signal is received by receiver circuitry within the RFFE of the ATAMP device 204. The CPU of the ATAMP device 204 can compare a previously stored "gold image" of a resonant RF signal generated at manufacturing time with the received resonant RF signal. In some aspects, the resonant RF signal is generated while the target device 100 is powered off. At operation 606, a notification (e.g., an alert message) is generated based on the analysis and evaluation of the target device (e.g., when the "gold image" does not match the received resonant RF signal).

In some aspects, the ATAMP device can be configured as an external device (e.g., device 700 in FIG. 7) to allow periodic interrogation of a variety of electronic devices. In some aspects, the ATAMP device can be configured in a multi-tone illuminator mode that would provide for detection of electronic device modifications and protection from physical tampering.

Figure 7:
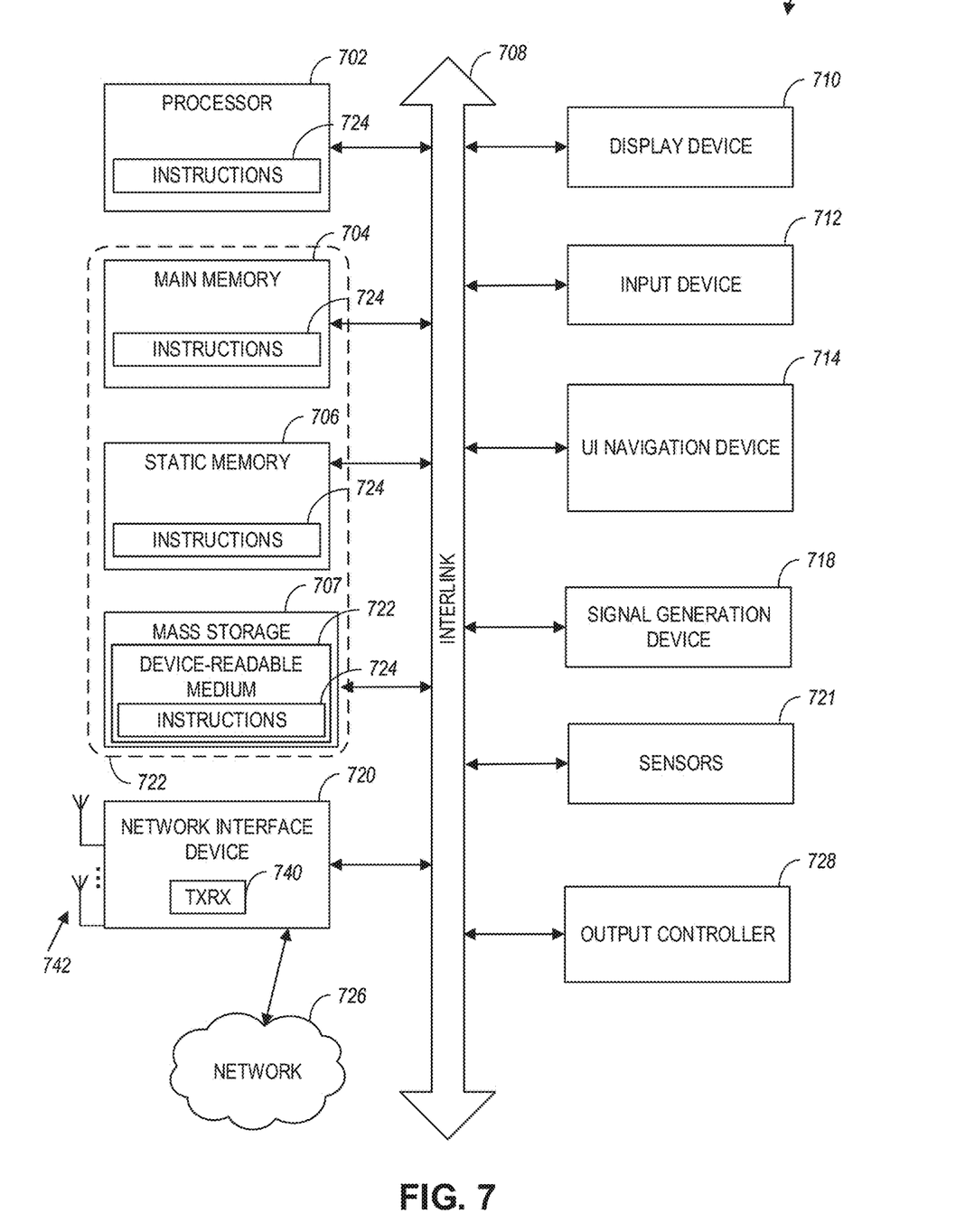
FIG. 7 illustrates a block diagram of a tamper-detection device in accordance with some embodiments.

FIG. 7 illustrates a block diagram of a tamper-detection device in accordance with some embodiments. In alternative aspects, the tamper-detection device 700 may operate as a standalone device or may be connected (e.g., networked) to other communication devices.

Circuitry (e.g., processing circuitry) is a collection of circuits implemented intangible entities of the device 700 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 700 follow.

In some aspects, the device 700 may operate as a standalone tamper-detection device or may be connected (e.g., networked) to other devices. In a networked deployment, the communication device 700 may operate in the capacity of a server communication device, a client communication device, or both in server-client network environments to perform one or more of the tamper detection functionalities discussed herein. In an example, the communication device 700 may act as a peer communication device in peer-to-peer (P2P) (or other distributed) network environment. The communication device 700 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device 700 may include a hardware processor 702 (e.g., a central processing unit (CPU), a graphics processing unit (GPU), a hardware processor core, or any combination thereof), a main memory 704, a static memory 706, and mass storage 707 (e.g., hard drive, tape drive, flash storage, or other block or storage devices), some or all of which may communicate with each other via an interlink (e.g., bus) 708.

The communication device 700 may further include a display device 710, an alphanumeric input device 712 (e.g., a keyboard), and a user interface (UI) navigation device 714 (e.g., a mouse). In an example, the display device 710, input device 712 and UI navigation device 714 may be a touchscreen display. The communication device 700 may additionally include a signal generation device 718 (e.g., a speaker), a network interface device 720, and one or more sensors 721, such as a global positioning system (GPS) sensor, compass, accelerometer, or another sensor. The communication device 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 707 may include a communication device-readable medium 722, on which is stored one or more sets of data structures or instructions 724 (e.g., software) embodying or utilized by any one or more of the techniques or functions described herein. In some aspects, registers of the processor 702, the main memory 704, the static memory 706, and/or the mass storage 707 may be, or include (completely or at least partially), the device-readable medium 722, on which is stored the one or more sets of data structures or instructions 724, embodying or utilized by any one or more of the techniques or functions described herein. In an example, one or any combination of the hardware processor 702, the main memory 704, the static memory 706, or the mass storage 716 may constitute the device-readable medium 722.

As used herein, the term "device-readable medium" is interchangeable with "computer-readable medium" or "machine-readable medium". While the communication device-readable medium 722 is illustrated as a single medium, the term "communication device-readable medium" may include a single medium or multiple media (e.g., a centralized or distributed database, and/or associated caches and servers) configured to store the one or more instructions 724.

The term "communication device-readable medium" is inclusive of the terms "machine-readable medium" or "computer-readable medium", and may include any medium that is capable of storing, encoding, or carrying instructions (e.g., instructions 724) for execution by the communication device 700 and that cause the communication device 700 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 724 may further be transmitted or received over a communications network 726 using a transmission medium (e.g., transceiver circuitry 740) via the network interface device 720 utilizing any one of a number of transfer protocols. In an example, the network interface device 720 may include one or more physical jacks (e.g., Ethernet, coaxial, or phone jacks) or one or more antennas to connect to the communications network 726. In an example, the network interface device 720 may include a plurality of antennas 742 coupled to the transceiver circuitry 740 to wirelessly communicate using at least one of single-input-multiple-output (SIMO), MIMO, or multiple-input-single-output (MISO) techniques. In some examples, the network interface device 720 may wirelessly communicate using Multiple User MIMO techniques. Additionally, the network interface device 720 can perform temper detection functionalities discussed herein using one or more transmitters and a receiver within the transceiver circuitry 740 as well as one or more of the plurality of antennas 742.

The term "transmission medium" shall be taken to include any intangible medium that is capable of storing, encoding or carrying instructions for execution by the communication device 700, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

The above-detailed description includes references to the accompanying drawings, which form a part of the detailed description. The drawings show, by way of illustration, specific embodiments in which some embodiments can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, the inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The invention claimed is:

1. An apparatus comprising:
radio frequency (RF) transceiver circuitry, the RF transceiver circuitry comprising at least one antenna communicatively coupled to a receiver and a transmitter; and
processing circuitry coupled to the RF transceiver circuitry, the processing circuitry to:
cause interrogation of a target device with a first plurality of electromagnetic signals emitted via the at least one antenna at a first time instance, to generate a reference evaluation of the target device;
cause interrogation of the target device with a second plurality of electromagnetic signals emitted via the at least one antenna at a second time instance, to generate a plurality of mixed RF signals;
detect emissions received from the target device via the receiver, the emissions generated by the target device based on the plurality of mixed RF signals;
perform a comparison of the reference evaluation of the target device with the emissions received from the target device to detect physical alteration or tampering of the target device; and
generate a notification based on the comparison.

2. The apparatus of claim 1, wherein the processing circuitry is further to:
perform a second comparison of a first signal characteristic associated with the received emissions and a second signal characteristic associated with the second plurality of electromagnetic signals interrogating the target device.

3. The apparatus of claim 2, wherein the processing circuitry is further to:
perform an evaluation of the target device based on the second comparison; and
generate a second notification based on the evaluation.

4. The apparatus of claim 2, wherein the at least one antenna is air-gapped from the target device, and wherein the first signal characteristic and the second signal characteristic include at least one of:
a signal frequency;
a frequency distribution metric;
a spectral power distribution metric;
a spectral density;
a signal pattern derived from changes in frequency, amplitude, or phase; and
existence of non-linear mixing spurs or mixing products.

5. The apparatus of claim 1, wherein the at least one antenna comprises a plurality of antennas, wherein the transmitter comprises a plurality of transmitters, and wherein each transmitter of the plurality of transmitters is coupled to a corresponding antenna of the plurality of antennas.

6. The apparatus of claim 5, wherein to interrogate the target device with the second plurality of electromagnetic signals, each transmitter of the plurality of transmitters is configured to transmit a corresponding electromagnetic signal of the second plurality of electromagnetic signals, the second plurality of electromagnetic signals being at a frequency offset from each other and covering a first predetermined frequency range.

7. The apparatus of claim 6, wherein the processing circuitry is further to:
cause scanning a second predetermined frequency range by the receiver, to detect the emissions from the target device.

8. The apparatus of claim 7, wherein the second predetermined frequency range is non-overlapping with the first predetermined frequency range.

9. The apparatus of claim 7, wherein scanning the second predetermined frequency range takes place when the target device is in a powered off state.

10. The apparatus of claim 1, wherein the received emissions from the target device comprise a resonant RF signal generated from reflections of the plurality of mixed RF signals by components of the target device.

11. The apparatus of claim 1, wherein the at least one antenna comprises a plurality of loop antennas, and wherein the plurality of loop antennas, the transmitter, and the receiver are electrically isolated from components of the target device.

12. The apparatus of claim 1, wherein the target device comprises at least one of:
a computer system;
a communications system;
an Internet connected device;
an avionics system;
a military system; and
a business system.

13. A method comprising:
interrogating a target device with a first plurality of electromagnetic signals emitted via at least one antenna at a first time instance, to generate a reference evaluation of the target device;
interrogating the target device with a second plurality of electromagnetic signals emitted via the at least one antenna at a second time instance, to generate a plurality of mixed RF signals;
detecting emissions received from the target device, the emissions generated by the target device based on the plurality of mixed RF signals;
performing a comparison of the reference evaluation of the target device with the emissions received from the target device to detect physical alteration or tampering of the target device; and
generating a notification based on the comparison.

14. The method of claim 13, further comprising:
performing a second comparison of a first signal characteristic associated with the received emissions and a second signal characteristic associated with the second plurality of electromagnetic signals interrogating the target device.

15. The method of claim 14, further comprising:
performing an evaluation of the target device based on the second comparison; and
generating a second notification based on the evaluation.

16. The method of claim 13, wherein interrogating the target device with the second plurality of electromagnetic signals comprises:
transmitting each electromagnetic signal of the second plurality of electromagnetic signals using a corresponding transmitter of a plurality of transmitters, the second plurality of electromagnetic signals being at a frequency offset from each other and covering a first predetermined frequency range.

17. The method of claim 16, further comprising:
scanning a second predetermined frequency range to detect the emissions from the target device.

18. A non-transitory computer-readable storage medium that stores instructions for execution by one or more processors of a tampering detection device, the instructions to configure the one or more processors to cause the tamper detection device to perform operations comprising:
interrogating a target device with a first plurality of electromagnetic signals emitted via at least one antenna at a first time instance, to generate a reference evaluation of the target device;
interrogating the target device with a second plurality of electromagnetic signals emitted via the at least one antenna at a second time instance, to generate a plurality of mixed RF signals;
detecting emissions received from the target device, the emissions generated by the target device based on the plurality of mixed RF signals;
performing a comparison of the reference evaluation of the target device with the emissions received from the target device to detect physical alteration or tampering of the target device; and
generating a notification based on the comparison.

19. The non-transitory computer-readable storage medium of claim 18, the operations further comprising:
performing a second comparison of a first signal characteristic associated with the received emissions and a second signal characteristic associated with the second plurality of electromagnetic signals interrogating the target device.

20. The non-transitory computer-readable storage medium of claim 19, the operations further comprising:
 performing an evaluation of the target device based on the second comparison; and
 generating a second notification based on the evaluation.

\* \* \* \* \*